(12) United States Patent
Jang et al.

(10) Patent No.: US 12,112,514 B2
(45) Date of Patent: Oct. 8, 2024

(54) DEVICE FOR GENERATING PREDICTION IMAGE ON BASIS OF GENERATOR INCLUDING CONCENTRATION LAYER, AND CONTROL METHOD THEREFOR

(71) Applicant: Samsung Electronics Co., Ltd., Gyeonggi-do (KR)

(72) Inventors: Junik Jang, Gyeonggi-do (KR); Jaeil Jung, Gyeonggi-do (KR); Jonghee Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 17/361,556

(22) Filed: Jun. 29, 2021

(65) Prior Publication Data

US 2021/0326650 A1    Oct. 21, 2021

Related U.S. Application Data

(63) Continuation of application No. PCT/KR2020/006356, filed on May 14, 2020.

(30) Foreign Application Priority Data

May 17, 2019 (KR) .......... 10-2019-0058189
Feb. 19, 2020 (KR) .......... 10-2020-0020271

(51) Int. Cl.
*G06V 10/40* (2022.01)
*G06F 18/214* (2023.01)
(Continued)

(52) U.S. Cl.
CPC ............ *G06V 10/40* (2022.01); *G06F 18/214* (2023.01); *G06N 3/045* (2023.01); *G06N 3/08* (2013.01);
(Continued)

(58) Field of Classification Search
CPC ...... G06V 10/40; G06V 10/75; G06V 10/774; G06V 10/82; G06F 18/214; G06N 3/045;
(Continued)

(56) References Cited

U.S. PATENT DOCUMENTS 9,129,158 B1 *  9/2015  Medasani ............. G06V 40/20
10,635,893 B2    4/2020  Zhong et al.
(Continued)

FOREIGN PATENT DOCUMENTS

GB    2 443 739 B    2/2009
JP    2009-060481 A    3/2009
(Continued)

OTHER PUBLICATIONS

V Mahadevan, W Li, V Bhalodia, and N Vasconcelos Anomaly detection in crowded scenes in 2010 IEEE Computer Society Conference on Computer Vision and Pattern Recognition, pp. 1975-1981 IEEE, 2010.
(Continued)

*Primary Examiner* — Charles T Shedrick
(74) *Attorney, Agent, or Firm* — Cha & Reiter, LLC

(57) ABSTRACT

According to certain embodiments, an electronic apparatus comprises: a memory storing a generator previously trained to generate a prediction image based on one or more input images; and a processor configured to: acquire feature data from a plurality of image frames input through at least one layer included in the generator, extract feature data corresponding to change over time from the feature data acquired through an attention layer included in the generator, and acquire a prediction image frame by inputting the extracted feature data to at least one other layer included in the generator.

9 Claims, 8 Drawing Sheets

(51) Int. Cl.
| | |
|---|---|
| *G06N 3/045* | (2023.01) |
| *G06N 3/08* | (2023.01) |
| *G06T 9/00* | (2006.01) |
| *G06V 10/75* | (2022.01) |
| *G06V 10/774* | (2022.01) |
| *G06V 10/82* | (2022.01) |

(52) U.S. Cl.
CPC .............. *G06T 9/002* (2013.01); *G06V 10/75* (2022.01); *G06V 10/774* (2022.01); *G06V 10/82* (2022.01)

(58) Field of Classification Search
CPC .......... G06N 3/08; G06N 3/047; G06T 9/002; H04N 5/145
See application file for complete search history.

(56) References Cited

U.S. PATENT DOCUMENTS

| | | | |
|---|---|---|---|
| 10,937,141 B2 | 3/2021 | Song et al. | |
| 2018/0336466 A1 | 11/2018 | Braun et al. | |
| 2018/0368721 A1 | 12/2018 | Ahn | |
| 2019/0258925 A1* | 8/2019 | Li | .......... G06F 16/583 |
| 2019/0333198 A1* | 10/2019 | Wang | ........ G06T 5/70 |
| 2020/0012896 A1* | 1/2020 | Yoo | ......... G06V 10/82 |
| 2020/0379640 A1* | 12/2020 | Bellegarda | ............. G06N 3/045 |
| 2020/0388021 A1* | 12/2020 | Song | ........ G06N 3/045 |
| 2022/0051061 A1* | 2/2022 | Chi | ....................... G06V 10/764 |
| 2022/0222409 A1* | 7/2022 | He | .......... G06F 30/27 |
| 2024/0095989 A1* | 3/2024 | Mallya | ................ G06V 10/761 |

FOREIGN PATENT DOCUMENTS

| | | |
|---|---|---|
| KR | 10-1180887 B1 | 9/2012 |
| KR | 10-2014-0076815 A | 6/2014 |
| KR | 10-2016-0093253 A | 8/2016 |
| KR | 10-1752387 B1 | 7/2017 |
| KR | 10-2018-0065498 A | 6/2018 |
| KR | 10-2018-0126353 A | 11/2018 |
| KR | 10-1916347 B1 | 11/2018 |
| KR | 10-2019-0049401 A | 5/2019 |
| KR | 10-1975186 B1 | 5/2019 |

OTHER PUBLICATIONS

M Mathieu, C Couprie, and Y LeCun Deep multi-scale video prediction beyond mean square error arXiv preprint arXiv: 1511.05440, 2015.
A Hore and D Ziou Image quality metrics: Psnr vs ssim. In 2010 20th International Conference on Pattern Recognition, pp. 2366-2369 IEEE, 2010.
J Van Amersfoort, A Kannan, M Ranzato, A Szlam, D Tran, and S Chintala Transformation-based models of video sequences. arXiv preprint arXiv:1701.08435, 2017.
C Vondrick, H Pirsiavash, and A Torralba. Generating videos with scene dynamics. In Advances in Neural Information Processing Systems, pp. 613-621, 2016.
C Vondrick and A Torralba. Generating the future with adversarial transformers. In Proceedings of the IEEE Conference on Computer Vision and Pattern Recognition, pp. 1020-1028, 2017.
T Xue, J Wu, K Bouman, and B Freeman Visual dynamics: Probabilistic future frame synthesis via cross convolutional networks. In Advances in Neural Information Processing Systems, pp. 91-99, 2016.
Y Yoo, S Yun, H Jin Chang, Y Demiris, and J Young Choi Variational autoencoded regression: high dimensional regression of visual data on complex manifold. In Proceedings of the IEEE Conference on Computer Vision and Pattern Recognition, pp. 3674-3683, 2017.
M Hasan, J Choi, J Neumann, A K Roy-Chowdhury, and L.S Davis Learning temporal regularity in video sequences. In Proceedings of the IEEE conference on computer vision and pattern recognition, pp. 733-742, 2016.
S Smeureanu, R T Ionescu, M Popescu, and B Alexe Deep appearance features for abnormal behavior detection in video. In International Conference on Image Analysis and Processing, pp. 779-789 Springer, 2017.
R Hinami, T Mei, and S Satoh Joint detection and recounting of abnormal events by learning deep generic knowledge. In Proceedings of the IEEE International Conference on Computer Vision, pp. 3619-3627, 2017.
R Tudor Ionescu, S Smeureanu, B Alexe, and M Popescu. Unmasking the abnormal events in video. In Proceedings of the IEEE International Conference on Computer Vision, pp. 2895-2903, 2017.
W Luo, W Liu, and S Gao A revisit of sparse coding based anomaly detection in stacked rnn framework in Proceedings of the IEEE International Conference on Computer Vision, pp. 341-349, 2017.
Christiansen, P, Nielsen, L, Steen, K, Jørgensen, R, & Karstoft, H (2016) DeepAnomaly: Combining background subtraction and deep learning for detecting obstacles and anomalies in an agricultural field Sensors, 16(11), 1904.
Basharat, A, Gritai, A, & Shah, M (Jun. 2008). Learning object motion patterns for anomaly detection and improved object detection. In 2008 IEEE Conference on Computer Vision and Pattern Recognition (pp. 1-8) IEEE.
An, J., & Cho, S. (2015). Variational autoencoder based anomaly detection using reconstruction probability. Special Lecture on IE, 2, 1-18.
Li, W., Mahadevan, V., & Vasconcelos, N. (2014). Anomaly detection and localization in crowded scenes. IEEE transactions on pattern analysis and machine intelligence, 36(1), 18-32.
Vincent, P, Larochelle, H, Lajoie, I, Bengio, Y, & Manzagol, P. A (2010) Stacked denoising autoencoders: Learning useful representations in a deep network with a local denoising criterion Journal of machine learning research, 11 (Dec), 3371-3408.
Ronneberger, p Fischer, and T Brox U-net: Convolutional networks for biomedical image segmentation in International Conference on Medical image computing and computer-assisted intervention, pp. 234-241 Springer, 2015.
Goodfellow, I, Pouget-Abadie, J, Mirza, M, Xu, B, Warde-Farley, D, Ozair, S, & Bengio, Y (2014) Generative adversarial nets in Advances in neural information processing systems (pp. 2672-2680).
M Ravanbakhsh, M Nabi, E Sangineto, L Marcenaro, C Regazzoni, and N Sebe Abnormal event detection in videos using generative adversarial nets In 2017 IEEE International Conference on Image Processing (ICIP), pp. 1577-1581 IEEE, 2017.
Bergmann, P, Lowe, S, Fauser, M, Sattlegger, D, & S t e g e r, C (2018) Improving Unsupervised Defect Segmentation by Applying Structural Similarity to Autoencoders arXiv preprint arXiv:180702011.
T Schlegl, P. Seeböock, S MWaldstein, U Schmidt-Erfurth, and G Langs Unsupervised anomaly detection with generative adversarial networks to guide marker discovery In International Conference on Information Processing in Medical Imaging, pp. 146-157 Springer, 2017.
B Chen, W Wang, and J Wang Video imagination from a single image with transformation generation in Proceedings of the on Thematic Workshops of ACM Multimedia 2017, pp. 358-366 ACM, 2017.
T-W Hui, X Tang, and C Change Loy Liteflownet: A lightweight convolutional neural network for optical flow estimation in Proceedings of the IEEE Conference on Computer Vision and Pattern Recognition, pp. 8981-8989, 2018.
E Ilg, N Mayer, T Saikia, M Keuper, A Dosovitskiy, and T Brox Flownet 20: Evolution of optical flow estimation with deep networks. In Proceedings of the IEEE conference on computer vision and pattern recognition, pp. 2462-2470, 2017.
A Dosovitskiy, P Fischer, E Ilg, P Hausser, C Hazirbas, V Golkov, P Van Der Smagt, D Cremers, and T Brox Flownet: Learning optical flow with convolutional networks in Proceedings of the IEEE international conference on computer vision, pp. 2758-2766, 2015.

(56) References Cited

OTHER PUBLICATIONS

K Simonyan and A Zisserman Two-stream convolutional networks for action recognition in videos in Advances in neural information processing systems, pp. 568-576, 2014.
W Liu, W Luo, D Lian, and S Gao Future frame prediction for anomaly detection-a new baseline. In Proceedings of the IEEE Conference on Computer Vision and Pattern Recognition, pp. 6536-6545, 2018.
H Zhang, I Goodfellow, D Metaxas, and A Odena Selfattention generative adversarial networks arXiv preprint arXiv:1805.08318, 2018.
X Wang, R Girshick, A Gupta, and K He Non-local neural networks in Proceedings of the IEEE Conference on Computer Vision and Pattern Recognition, pp. 7794-7803, 2018.
Zeng, K, Yu, J, Wang, R, Li, C, & Tao, D (2015) Coupled deep autoencoder for single image super-resolution IEEE transactions on cybernetics, 47(1), 27-37.
H Cai, C Bai, Y-W Tai, and C-K Tang. Deep video generation, prediction and completion of human action sequences. In Proceedings of the European Conference on Computer Vision (ECCV), pp. 366-382, 2018.
Y S Chong and Y H Tay. Abnormal event detection in videos using spatiotemporal autoencoder. In International Symposium on Neural Networks, pp. 189-196 Springer, 2017.
W Luo, W Liu, and S Gao. Remembering history with convolutional lstm for anomaly detection. In 2017 IEEE International Conference on Multimedia and Expo (ICME), pp. 439-444 IEEE, 2017.
C Lu, J Shi, and J Jia Abnormal event detection at 150 fps in matlab in Proceedings of the IEEE international conference on computer vision, pp. 2720-2727, 2013.

* cited by examiner

FIG. 6

|  | CUHK | UCSD | |
|---|---|---|---|
|  |  | PED1 | PED2 |
| Conv-AE [28] | 80.0% | 75.0% | 85.0% |
| DeepAppearance [29] | 84.6% | - | - |
| Recounting [30] | - | - | 92.2% |
| Unmasking [31] | 80.6% | 68.4% | 82.2% |
| StackedRNN [32] | 81.7% | - | 92.2% |
| Unet without OF [12] | 83.7% | 81.8% | 93.5% |
| Unet with OF [12] | 85.1% | 83.1% | 95.4% |
| Proposed | 85.6% | 83.6% | 94.9% |

DEVICE FOR GENERATING PREDICTION IMAGE ON BASIS OF GENERATOR INCLUDING CONCENTRATION LAYER, AND CONTROL METHOD THEREFOR

This application is a Continuation of PCT International Application No. PCT/KR2020/006356 filed on May 14, 2020, and claims priority to Korean Patent Application No. 10-2019-0058189 filed on May 17, 2019, and Korean Patent Application No. 10-2020-0020271 filed on Feb. 19, 2020, the contents of which are incorporated herein by reference.

TECHNICAL FIELD

An electronic apparatus for generating a prediction image based on a plurality of input (past) images. More particularly, an electronic apparatus using a generator model including an attention layer itself is disclosed

BACKGROUND ART

Artificial intelligence models have been devised to generate a prediction image frame to followed previously sequential image frames.

For example, a generator model for generating prediction image frames could be trained through a generative adversarial network (GAN). This generator model could be used, for example, for anomaly detection of video captured through CCTV.

However, in the case of a generator model that is retrained by comparing the generated prediction image with the actual image, there have been a problem that a target portion to be monitored in the image is not clearly specified.

To solve this problem, a solution has been proposed that uses an optical flow-based model for modeling more accurate motion patterns together with a generator model. ([8], [9], [10])

However, in the case of using an optical flow-based model, it is difficult to flexibly cope with characteristics of images that vary depending on situations (e.g., difference in target between a person-centered situation and a natural disaster-centered situation), which makes it less versatile, and a separate model had to be trained independently in addition to the generator model.

The followings are related documents.

[1] Vincent, P, Larochelle, H, Lajoie, I, Bengio, Y, & Manzagol, P. A (2010) Stacked denoising autoencoders: Learning useful representations in a deep network with a local denoising criterion Journal of machine learning research, 11 (December), 3371-3408

[2] O Ronneberger, P Fischer, and T Brox U-net: Convolutional networks for biomedical image segmentation In International Conference on Medical image computing and computer-assisted intervention, pages 234-241 Springer, 2015

[3] Goodfellow, I, Pouget-Abadie, J, Mirza, M, Xu, B, Warde-Farley, D, Ozair, S, & Bengio, Y (2014) Generative adversarial nets In Advances in neural information processing systems (pp 2672-2680)

[4] M Ravanbakhsh, M Nabi, E Sangineto, L Marcenaro, C Regazzoni, and N Sebe Abnormal event detection in videos using generative adversarial nets In 2017 IEEE International Conference on Image Processing (ICIP), pages 1577-1581 IEEE, 2017.

[5] Bergmann, P, Lowe, S, Fauser, M, Sattlegger, D, & Steger, C (2018) Improving Unsupervised Defect Segmentation by Applying Structural Similarity to Autoencoders arXiv preprint arXiv:180702011

[6] T Schlegl, P Seeböck, S M Waldstein, U Schmidt-Erfurth, and G Langs Unsupervised anomaly detection with generative adversarial networks to guide marker discovery In International Conference on Information Processing in Medical Imaging, pages 146-157 Springer, 2017

[7] B Chen, W Wang, and J Wang Video imagination from a single image with transformation generation In Proceedings of the on Thematic Workshops of ACM Multimedia 2017, pages 358-366 ACM, 2017.

[8] T-W Hui, X Tang, and C Change Loy Liteflownet: A lightweight convolutional neural network for optical flow estimation In Proceedings of the IEEE Conference on Computer Vision and Pattern Recognition, pages 8981-89, 2018

[9] E Ilg, N Mayer, T Saikia, M Keuper, A Dosovitskiy, and T Brox Flownet 20: Evolution of optical flow estimation with deep networks. In Proceedings of the IEEE conference on computer vision and pattern recognition, pages 2462-2470, 2017.

[10] A Dosovitskiy, P Fischer, E Ilg, P Hausser, C Hazirbas, V Golkov, P Van Der Smagt, D Cremers, and T Brox Flownet: Learning optical flow with convolutional networks In Proceedings of the IEEE international conference on computer vision, pages 2758-2766, 2015

[11] K Simonyan and A Zisserman Two-stream convolutional networks for action recognition in videos In Advances in neural information processing systems, pages 568-576, 2014

[12] W Liu, W Luo, D Lian, and S Gao Future frame prediction for anomaly detection-a new baseline. In Proceedings of the IEEE Conference on Computer Vision and Pattern Recognition, pages 6536-6545, 2018

[13] H Zhang, I Goodfellow, D Metaxas, and A Odena Selfattention generative adversarial networks arXiv preprint arXiv:1805.08318, 2018

[14] X Wang, R Girshick, A Gupta, and K He Non-local neural networks In Proceedings of the IEEE Conference on Computer Vision and Pattern Recognition, pages 7794-7803, 2018

[15] Zeng, K, Yu, J, Wang, R, Li, C, & Tao, D (2015) Coupled deep autoencoder for single image super-resolution IEEE transactions on cybernetics, 47(1), 27-37

[16] H Cai, C Bai, Y-W Tai, and C-K Tang. Deep video generation, prediction and completion of human action sequences. In Proceedings of the European Conference on Computer Vision (ECCV), pages 366-382, 2018.

[17] Y S Chong and Y H Tay. Abnormal event detection in videos using spatiotemporal autoencoder. In International Symposium on Neural Networks, pages 189-196 Springer, 2017

[18] W Luo, W Liu, and S Gao. Remembering history with convolutional lstm for anomaly detection. In 2017 IEEE International Conference on Multimedia and Expo (ICME), pages 439-444 IEEE, 2017

[19] C Lu, J Shi, and J Jia Abnormal event detection at 150 fps in matlab In Proceedings of the IEEE international conference on computer vision, pages 2720-2727, 2013.

[20] V Mahadevan, W Li, V Bhalodia, and N Vasconcelos Anomaly detection in crowded scenes In 2010 IEEE Computer Society Conference on Computer Vision and Pattern Recognition, pages 1975-1981 IEEE, 2010

[21] M Mathieu, C Couprie, and Y LeCun Deep multi-scale video prediction beyond mean square error arXiv preprint arXiv:1511.05440, 2015.

[22] A Hore and D Ziou Image quality metrics: Psnr vs ssim. In 2010 20th International Conference on Pattern Recognition, pages 2366-2369 IEEE, 2010

[23] J Van Amersfoort, A Kalman, M Ranzato, A Szlam, D Tran, and S Chintala Transformation-based models of video sequences. arXiv preprint arXiv:1701.08435, 2017.

[24] C Vondrick, H Pirsiavash, and A Torralba. Generating videos with scene dynamics. In Advances In Neural Information Processing Systems, pages 613-621, 2016

[25] C Vondrick and A Torralba. Generating the future with adversarial transformers. In Proceedings of the IEEE Conference on Computer Vision and Pattern Recognition, pages 1020-1028, 2017

[26] T Xue, J Wu, K Bouman, and B Freeman Visual dynamics: Probabilistic future frame synthesis via cross convolutional networks. In Advances in Neural Information Processing Systems, pages 91-99, 2016

[27] Y Yoo, S Yun, H Jin Chang, Y Demiris, and J Young Choi Variational autoencoded regression: high dimensional regression of visual data on complex manifold. In Proceedings of the IEEE Conference on Computer Vision and Pattern Recognition, pages 3674-3683, 2017

[28] M Hasan, J Choi, J Neumann, A K Roy-Chowdhury, and L. S Davis Learning temporal regularity in video sequences. In Proceedings of the IEEE conference on computer vision and pattern recognition, pages 733-742, 2016

[29] S Smeureanu, R T Ionescu, M Popescu, and B Alexe Deep appearance features for abnormal behavior detection in video. In International Conference on Image Analysis and Processing, pages 779-789 Springer, 2017

[30] R Hinami, T Mei, and S Satoh Joint detection and recounting of abnormal events by learning deep generic knowledge. In Proceedings of the IEEE International Conference on Computer Vision, pages 3619-3627, 2017

[31] R Tudor Ionescu, S Smeureanu, B Alexe, and M Popescu. Unmasking the abnormal events in video. In Proceedings of the IEEE International Conference on Computer Vision, pages 2895-2903, 2017

[32] W Luo, W Liu, and S Gao A revisit of sparse coding based anomaly detection in stacked rnn framework In Proceedings of the IEEE International Conference on Computer Vision, pages 341-349, 2017

[33] Christiansen, P, Nielsen, L, Steen, K, Jorgensen, R, & Karstoft, H (2016) DeepAnomaly: Combining background subtraction and deep learning for detecting obstacles and anomalies in an agricultural field Sensors, 16(11), 1904

[34] Basharat, A, Gritai, A, & Shah, M (2008, June). Learning object motion patterns for anomaly detection and improved object detection. In 2008 IEEE Conference on Computer Vision and Pattern Recognition (pp 1-8) IEEE.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Technical Solution

According to certain embodiments, an electronic apparatus comprises: a memory storing a generator previously trained to generate a prediction image based on one or more input images; and a processor configured to: acquire feature data from a plurality of image frames input through at least one layer included in the generator, extract feature data corresponding to change over time from the feature data acquired through an attention layer included in the generator, and acquire a prediction image frame by inputting the extracted feature data to at least one other layer included in the generator.

The processor may be configured to, based on a result of comparing an image frame inputted after the plurality of image frames and the prediction image frame, train the generator including the attention layer.

Each of the plurality of image frames may comprise a plurality of pixels, and wherein the attention layer is configured to be trained to extract feature data of pixels predicted to change over time from feature data for each of the plurality of pixels outputted from the at least one layer.

The memory may be configured to include a discriminator trained to identify whether the inputted image is a real image frame or not, and wherein the processor is configured to train the generator based on the output acquired by inputting the prediction image frame into the discriminator.

The plurality of image frames may be configured to correspond to a normal situation, and wherein the processor is configured to input a plurality of image frames captured according to time into the generator to generate a prediction image frame, and based on an image frame captured after the plurality of captured image frames and the generated prediction image frame, identify whether an abnormal situation occurs.

The generator may be configured to include a first neural network for performing encoding with respect to the plurality of inputted image frames, and a second neural network for performing decoding with respect to data encoded through the first neural network, wherein the first neural network includes a first attention layer and the second neural network includes a second attention layer, and wherein the processor is configured to perform max-pooling through the first attention layer and perform deconvolution through the second attention layer.

The generator may be composed of U-net in which at least one output excluding an output layer from a plurality of layers of the first neural network is inputted into at least one layer excluding an input layer from a plurality of layers of the second neural network.

According to certain embodiments, a method for controlling an electronic apparatus including a memory storing a generator previously trained to generate a prediction image based on one or more inputted images is stored, the method comprising: inputting a plurality of image frames inputted according to time into the generator; acquiring feature data from the plurality of image frames input through at least one layer included in the generator, extracting feature data corresponding to change over time from the feature data acquired through an attention layer included in the generator, and acquiring a prediction image frame by inputting the extracted feature data to at least one other layer included in the generator.

The method may further include based on a result of comparing an image frame inputted after the plurality of image frames and the prediction image frame, training the generator including the attention layer.

Each of the plurality of image frames comprises a plurality of pixels, and wherein the training the generator includes training the attention layer to extract feature data of pixels predicted to change over time from feature data for each of the plurality of pixels outputted from the at least one layer.

The memory may be configured to include a discriminator trained to identify whether the inputted image is a real image frame or not, and wherein the training includes training the generator based on the output acquired by inputting the prediction image frame into the discriminator.

The plurality of image frames may be configured to correspond to a normal situation, and wherein the method further includes inputting a plurality of image frames captured according to time into the generator to generate a prediction image frame, and based on an image frame captured after the plurality of captured image frames and the generated prediction image frame, identifying whether an abnormal situation occurs.

The generator may be configured to include a first neural network including a first attention layer and a second neural network including a second attention layer, and wherein the generating the prediction image frame includes performing encoding with respect to the plurality of inputted image frames through the first neural network, and performing, through the second neural network, decoding with respect to data encoded through the first neural network, wherein the encoding includes performing max-pooling through the first attention layer, and wherein the decoding includes performing deconvolution through the second attention layer.

According to certain embodiments, a non-transitory computer-readable recording medium that is executed by a processor of an electronic apparatus including a memory storing a generator previously trained to generate a prediction image based on one or more inputted image, the non-transitory computer-readable recording medium storing at least one instruction to cause the electronic apparatus to perform a plurality of operations comprising: inputting a plurality of image frames according to time; acquiring feature data from the plurality of image frames input through at least one layer included in the generator; extracting feature data corresponding to change over time from the feature data acquired through an attention layer included in the generator, and inputting the extracted feature data into at least one other layer included in the generator to acquire a prediction image frame.

Effect of the Invention

Unlike the conventional generator, the electronic apparatus according to the disclosure may generate a more accurate prediction image frame by using a generator including an attention layer.

Even if a separate model trained to predict optical flow is not used, the electronic apparatus according to the disclosure may generate an accurate prediction image frame, while reducing the amount of computation and data, sine a motion pattern over time may be considered through the generator's own configuration.

BRIEF DESCRIPTION OF DRAWINGS

FIG. 6 is a table illustrating an effect of a generator of the disclosure in which an attention layer is self-contained.

MODE FOR IMPLEMENTING THE DISCLOSURE

Figure 1:
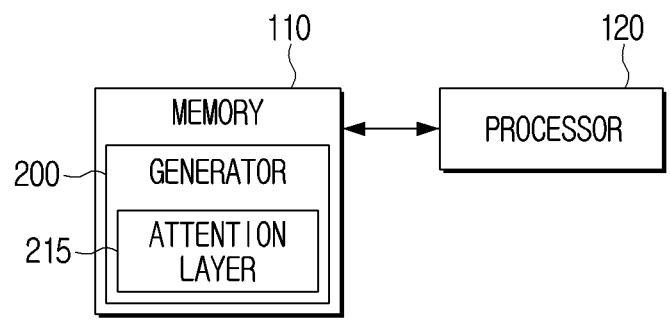
FIG. 1 is a block diagram illustrating a configuration of an electronic apparatus according to an embodiment.

Certain embodiments of the disclosure provide an electronic apparatus for generating a prediction image frame using a generator model including an attention layer itself.

Specifically, the certain embodiments provide an electronic apparatus using a generator model that enables a prediction image frame to be generated in an end-to-end manner as long as previous sequential image frames are input.

Certain embodiments provide for an electronic apparatus that flexibly copes with characteristics of images that vary depending on situations (e.g., difference in target between a person-centered situation and a natural disaster-centered situation).

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

Also, the same reference numerals or symbols described in the attached drawings denote parts or elements that actually perform the same functions. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

In addition, in order to distinguish between the components, terms including an ordinal number such as "first", "second", etc. may be used in the present specification and claims. The ordinal numbers are used in order to distinguish the same or similar elements from one another, and the use of the ordinal number should not be understood as limiting the meaning of the terms. For example, used orders, arrangement orders, or the like of elements that are combined with these ordinal numbers may not be limited by the numbers. The respective ordinal numbers are interchangeably used, if necessary.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the exemplary embodiment of the disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor (not shown).

Also, when any part is connected to another part, this includes a direct connection and an indirect connection through another medium. Further, when a certain portion includes a certain element, unless specified to the contrary, this means that another element may be additionally included, rather than precluding another element.

Hereinafter, the present invention will be described in detail with reference to the attached drawings.

FIG. 1 is a block diagram illustrating a configuration of an electronic apparatus according to an embodiment.

Referring to FIG. 1, the electronic apparatus 10 may include a memory 110 and a processor 120. The term processor 120 shall be understood to include one or more processors 120. The electronic apparatus 10 may be implemented as a server device, a smart phone, tablet, and other various PCs or terminal devices.

The memory 110 stores an operating system (OS). The OS comprises a plurality of executable instruction, which when executed by processor 120, controls an overall operation of components of the electronic apparatus 10 and a component for storing various data related to the components of the electronic apparatus 10. At least one instruction related to one or more components of the electronic apparatus 10 may be stored in the memory 110.

For this operation, the memory 110 may be implemented as a non-volatile memory (e.g., a hard disk, a solid state drive (SSD), a flash memory), a volatile memory, or the like.

A generator 200 may be stored in the memory 110. The generator 200 is a model for generating a prediction image based on one or more input images. The generator 200 may be previously trained based on a plurality of sequential images and a known image following the plurality of images. That is, the generator 200 may generated a prediction image following a plurality of sequential images, and be trained by comparison of the prediction image with the actual known image.

The generator 200 may be composed of a plurality of neural network layers. Each layer has a plurality of weight values, and perform a layer operation through an operation result of a previous layer and a plurality of weight values.

The generator 200 according to an embodiment of the disclosure may be partially implemented as a generative model including a convolutional neural network (CNN), but is not limited thereto.

The generator 200 may include an attention layer 215. The attention layer 215 is a layer for extracting feature data related to motion over time from feature data output from some layers of the generator 200.

Specific configurations of the generator 200 and the attention layer 215 will be described below with reference to FIGS. 2 to 4.

The processor 120 may control the overall operation of the electronic apparatus 10. In addition, the processor 120 may be connected to the memory 110 to control the electronic apparatus 100.

For this operation, the processor 120 may include a central processing unit (CPU), a graphical processing unit (GPU), a neural processing unit (NPU), or the like in hardware, and perform control-related operations and data processing included in the electronic apparatus 100.

The processor 120 may be implemented as a micro processing unit (MPU), or may correspond to a computer in which random access memory (RAM) and read only memory (ROM) are connected to a CPU or the like through a system bus.

The processor 120 may control not only hardware components included in the electronic apparatus 10, but also one or more software modules included in the electronic apparatus 10, and a result of controlling the software module by the processor 120 may be derived as an operation of hardware components.

The processor 120 may be composed of one or a plurality of processors. In this case, one or more processors may be general-purpose processors such as CPU and AP, a graphics-only processor such as GPU, VPU or the like, or an artificial intelligence-only processor such as NPU.

One or the plurality of processors may control and process input data according to a predefined operation rule or an artificial intelligence model stored in the memory. A predefined operation rule or artificial intelligence model is characterized by being generated through learning (training).

Being generated through learning means that a predefined operation rule or an artificial intelligence model of a desired characteristic is generated by applying a learning algorithm to a plurality of learning data. Such learning may be performed in a device on which artificial intelligence according to the disclosure is performed, or may be performed through a separate server/system.

The learning algorithm is a method in which a predetermined target device (e.g., a robot) is trained using a plurality of learning data such that a predetermined target device can make a decision or make a prediction by itself. Examples of learning algorithms include supervised learning, unsupervised learning, semi-supervised learning, or reinforcement learning, and the learning algorithm in this disclosure is not limited to the examples described above except for being specified.

The processor 120 according to an embodiment of the disclosure may generate a prediction image frame by inputting a plurality of image frames inputted according to a time based into a generator. The time based can be similar to the time of capture of the frames, where the frames are video frames. The plurality of image frames inputted according to time may be a plurality of image frames sequentially input in the past according to a chronological order. For example, the plurality of image frames may constitute a video as images sequentially captured in chronological order. Alternatively, the plurality of image frames may be sequential image frames constituting an animation or a virtual image.

The prediction image frame means an image frame predicted to appear immediately after the plurality of image frames at regular increment of time later.

Specifically, the processor 120 may acquire feature data from a plurality of input image frames through at least one layer included in the generator 200. As a result of the plurality of image frames being input to an input layer of the generator 200 and going through one or more layers, feature data may be acquired.

In addition, the processor 120 may extract feature data corresponding to a change over time from the acquired feature data through the attention layer 215 included in the generator 200. That is, as a result of inputting the previously acquired feature data to the attention layer 215, feature data corresponding to a change over time among the acquired feature data may be extracted.

For example, it may be assumed that each of the plurality of image frames is composed of a plurality of pixels. In this case, the acquired feature data may be feature data for each of a plurality of pixels. As a result of inputting feature data for each of the plurality of pixels to the attention layer 215, only feature data of some pixels among the feature data for each of the plurality of pixels may be extracted. Some pixels may be defined as pixels that are predicted to change over time, but are not limited thereto. In certain embodiments, features can be detected by performing edge detection and finding patterns of edges. The similar pattern of edges can be searched for in subsequent frames.

In addition, the processor 120 may acquire the prediction image frame by inputting the extracted feature data to at least one other layer included in the generator 200.

The processor 120 may train the generator 200 based on a result of comparing a real image frame with the prediction image frame.

The real image frame may actually be an image frame captured or input immediately after the plurality of image frames. The real image frame may constitute one video together with a plurality of image frames.

As a specific example, the processor 120 may train the generator 200 to reduce Residual Loss and/or Gradient Loss between a real image frame and a prediction image frame. As the gradient loss is minimized, blurring in the generated prediction image frame may be reduced.

The attention layer 215 may be trained to extract feature data of pixels predicted to change over time from the feature data for each of the plurality of pixels outputted from at least one layer.

Meanwhile, the processor 120 may train the generator 200 based on a feedback of a discriminator, which will be described below with reference to FIG. 5.

Figure 2:
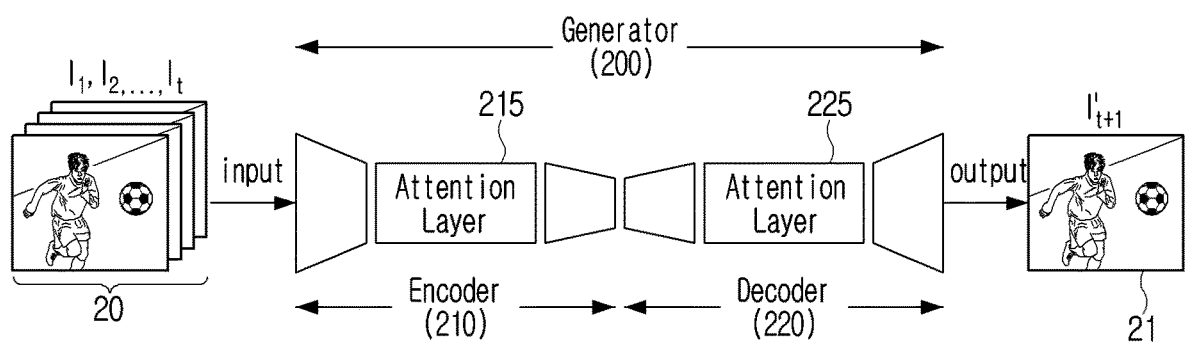
FIG. 2 is a view functionally illustrating a configuration of a generator according to an embodiment.

FIG. 2 is a view functionally illustrating a configuration of a generator according to an embodiment.

Referring to FIG. 2, the generator 200 according to an embodiment of the disclosure may include a first neural network (Encoder 210) for encoding a plurality of inputted image frames. The encoder 210 can include, for example, an encoder according the Motion Pictures Expert Group (MPEG), or Advanced Video Compression (AVC).

In addition, the generator 200 may be connected to the first neural network (Encoder. 210) and include a second neural network (Decoder 220) for decoding data encoded through the first neural network (Encoder 210).

Referring to FIG. 2, the encoder 210 may include a first attention layer 215, and the decoder 220 may include a second attention layer 225.

As a result of inputting a plurality of sequential image frames 20 to the generator 200 including the encoder 210 and the decoder 220, a prediction image frame 21 immediately following the plurality of image frames 20 may be generated. In certain embodiments, the generator 200 can examine motion vectors of different blocks over a number of frames, and use curve fitting to predict motion vectors between the last received frame and the predicted frame. Predicted frame can be generated by applying the predicted motion vectors to the last received frame.

Figure 3:
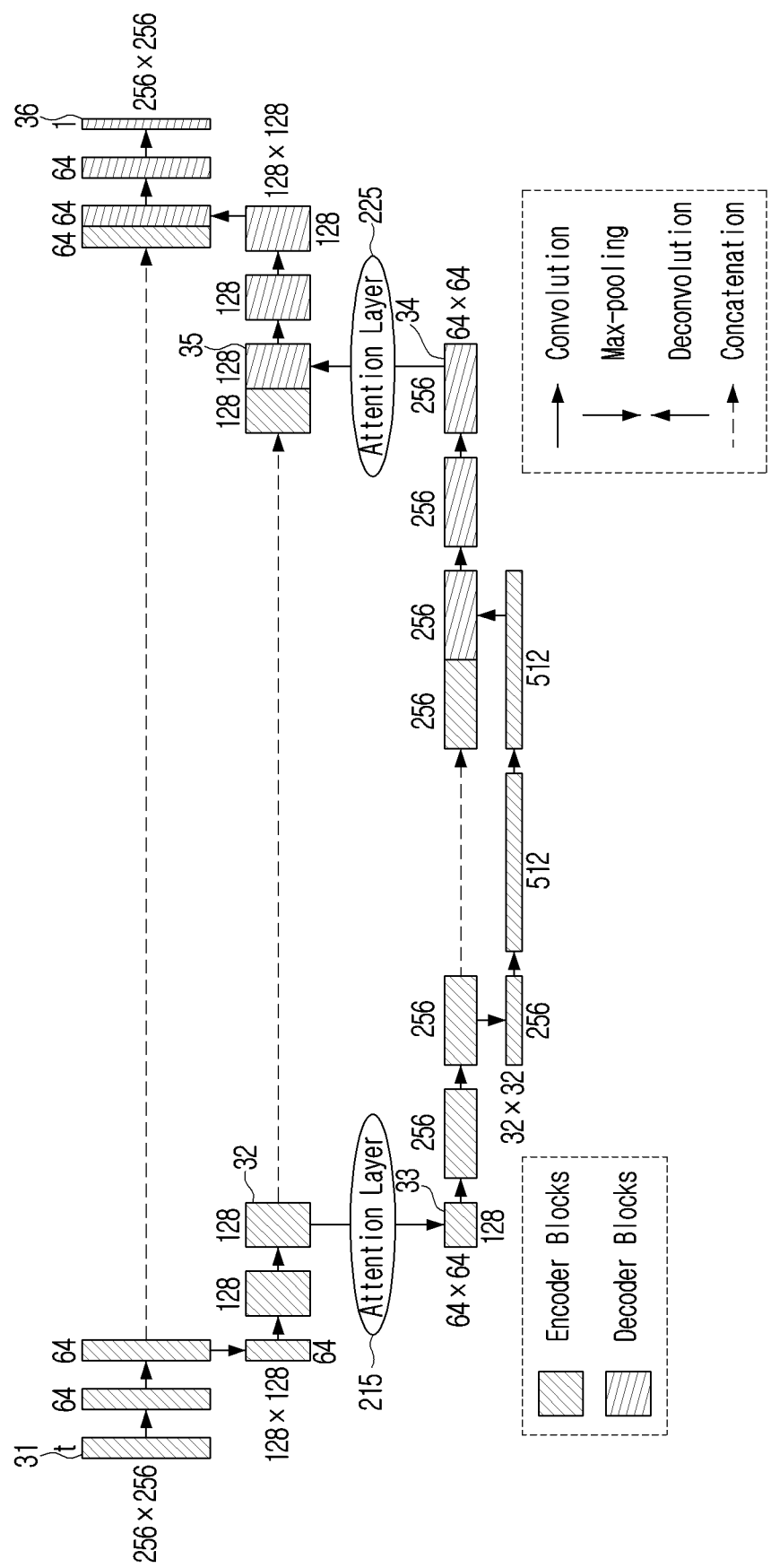
FIG. 3 is a view illustrating a process of processing image data blocks acquired through each layer in a generator according to the disclosure.

Referring to FIG. 2, FIG. 3 is a view illustrating a process of processing image data blocks acquired through each layer in the generator according to the disclosure. FIG. 3 illustrates intermediate results acquired through a plurality of layers in the generator 200 as image data blocks.

FIG. 3 assumes that an image data block 31 with respect to image frames having a resolution of 256×256 is input to a first layer in the generator 200. Although 256×256 is used, it shall be noted that other size blocks can be used, such as, and not limited to 1920×1080. The 't' refers to the number of image frames.

Referring to FIG. 3, as a result of the image data block 31 going through a plurality of layers, a number of convolutions and max-pooling may be performed, and a resulting image data block 32 may be input to the attention layer 215.

Convolution refers to acquiring a new output by applying filter values or weight values to input data. Convolution may be performed by one or more layers.

Pooling refers to an operation of sampling or resizing input data and may be performed through one or more layers. Max-pooling refers to an operation of extracting a maximum value from the input data.

As a result of performing convolution and max-pooling, the image data block 32 may include feature data for a resolution of 128×128, which is smaller than the existing number of pixels.

As a result of inputting the image data block 32 to the first attention layer 215, max-pooling may be performed again. Specifically, the attention layer 215 may output feature data of pixels whose motion over time is relatively large among a plurality of pixels constituting the image data block 32.

As a result, an image data block 33 including feature data with respect to a resolution of 64×64 may be acquired.

Meanwhile, referring to FIG. 3, convolution, max-pooling, and deconvolution may be additionally performed on the image data block 33 thereafter. As a result, an image data block 34 can be acquired.

Deconvolution refers to an operation necessary to return a size of data changed or reduced by convolution or pooling to a size at the time of input. Deconvolution may correspond to upsampling, but is not limited thereto.

Referring to FIG. 3, when the image data block 34 including 256 image frames of image data (or feature data) having a resolution of 64×64 is input to the second attention layer 225, deconvolution may be performed. Specifically, the second attention layer 225 may acquire an image data block 35 including image data corresponding to a change in motion over time from the image data block 34. Referring to FIG. 3, the image data block 35 may correspond to 128 image frames having a resolution of 128×128.

Concatenation may be performed to connect the image data block 32 to the image data block 35 described above.

Concatenation may refer to concatenation or concatenation, and in the case of FIG. 3, the image data block 32 and the image data block 35 corresponding to the number of 128 image frames are connected to each other such that a larger image data block (corresponding to 256 image frames) is formed. In certain embodiments, a deblocking filter can smooth the boundaries between the blocks.

As a result of performing convolution and deconvolution, one prediction image frame 36 may be finally output.

Meanwhile, as described in FIG. 3, the image data block 32 corresponding to the encoder block output from at least some layers of the encoder 210 may be input to at least some layers of the decoder 220 along with the image data block 35 corresponding to the decoder block.

As such, in addition to the output of the encoder 210 in the generator 200 being connected to the input of the decoder 220, at least one output excluding the output layer among the plurality of layers of the encoder 210 may be input to at least one of the layers among the plurality of layers of the decoder 220. In other words, the generator 200 may be configured as a U-net.

Meanwhile, in relation to the embodiment of FIG. 3 described above, the number or order of convolution/deconvolution/max-pooling/concatenation, etc. may be modified by those skilled in the art, a resolution and the number of image frames of each of image data blocks to be input or output of each of the layers in the generator 200 may also be variously defined.

Figure 4:
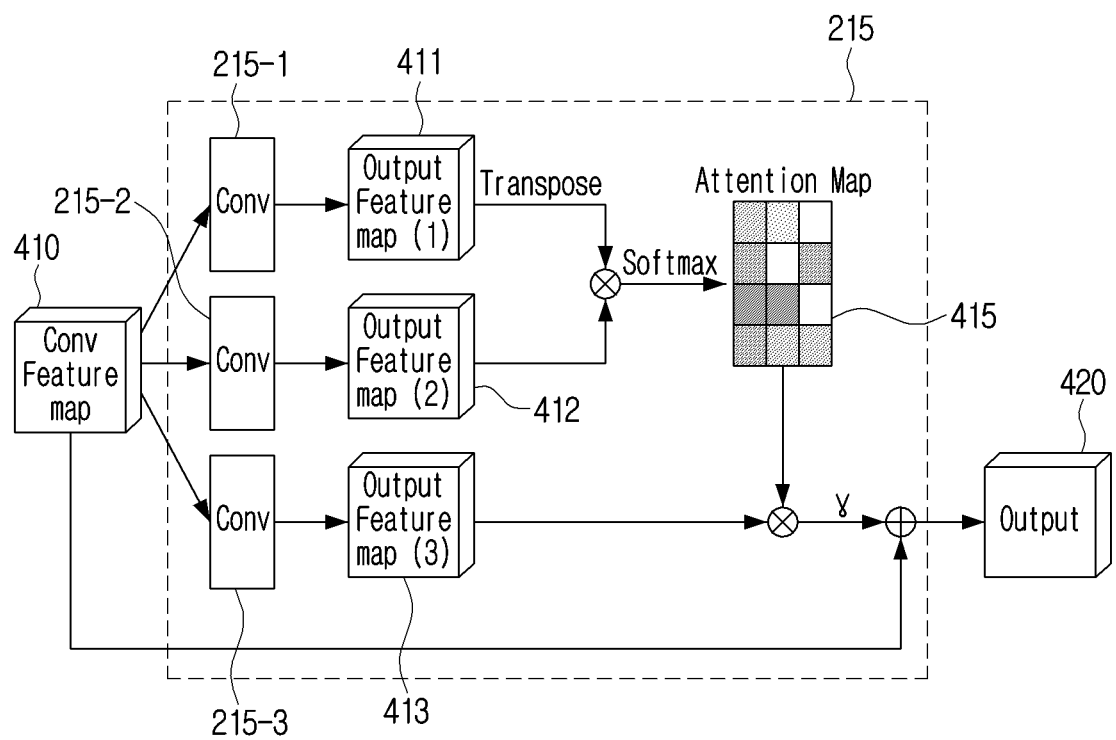
FIG. 4 is a block diagram illustrating a configuration of an attention layer included in a generator according to an embodiment.

FIG. 4 is a block diagram illustrating a configuration of an attention layer included in a generator according to an embodiment.

Referring to FIG. 4, a feature map 410 may be input to the attention layer 215. The feature map 410 may include feature data for each pixel acquired as a result of a plurality of image frames input to the generator 200 going through at least one layer in the generator 200. Specifically, the feature map 410 may include information on time and/or space within a plurality of input image frames. For example, the feature map 410 may be included in the image data block 32 of FIG. 3.

Referring to FIG. 4, the feature map 410 may be input to different convolution layers 215-1 and 215-2 in the attention layer 215, respectively. In addition, matrix multiplication is performed on the feature maps 411 and 412 output from different convolution layers 215-1 and 215-2, and as a result of applying softmax, an attention map 415 may be output.

Each element of the attention map 415 represents an attention probability for a specific spatial point and/or a temporal point in the input feature map 410.

Meanwhile, referring to FIG. 4, a feature map 413 may be acquired as a result of inputting the feature map 410 to the convolution layer 215-3.

In addition, matrix multiplication may be performed on the feature map 413 and the attention map 415 and γ may be multiplied. In addition, as a result of adding the feature map 410 initially inputted and added again, the output data 420 of the attention layer 215 may be generated.

γ is a trainable scale parameter for allocating non-local evidence.

The attention layer 215 configured as shown in FIG. 4 may be trained on spatial/temporal correlation of a plurality of input image frames. Based on the spatial/temporal correlation output through the trained attention layer 215, the generator 200 of the disclosure may improve performance in generating a prediction image frame following the plurality of image frames.

Meanwhile, as described in FIGS. 2 and 3, the generator 200 may include two or more attention layers, and the second attention layer 225 as well as the first attention layer 215 may have a similar configuration complying with FIG. 4.

The memory 110 may further include a discriminator trained to identify whether the input image frame is a real image frame or a fake image frame. The discriminator may also be implemented as a neural network model.

The processor 120 may train the generator 300 based on the output acquired by inputting the prediction image frame to the discriminator.

Figure 5:
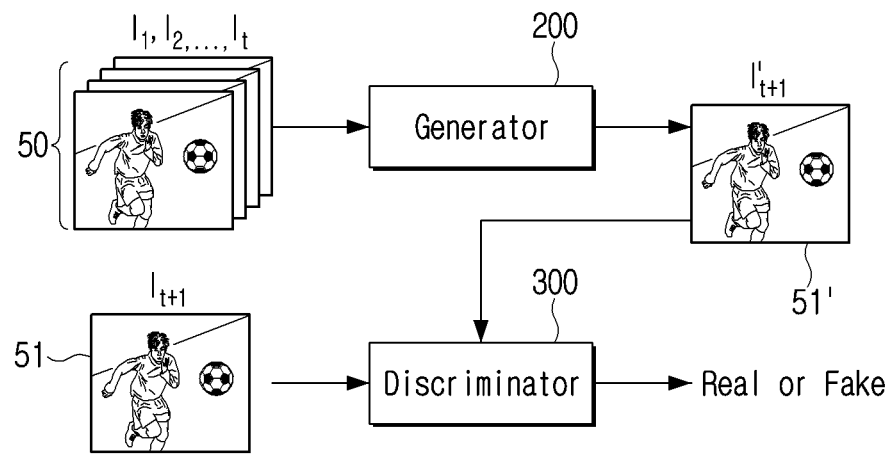
FIG. 5 is a block diagram illustrating a discriminator for determining whether an image frame generated by a generator is authentic or not according to an embodiment.

Regarding the above, FIG. 5 is a block diagram illustrating a discriminator for identifying whether an image frame generated by a generator is authentic or not according to an embodiment of the disclosure.

The discriminator 300 may operate as a classifier capable of discriminating whether the inputted image frame is a real image frame or a fake image frame. The fake image frame refers to an image frame generated virtually through the generator 200 or the like, and the real image frame refers to an image in a real image that is not generated virtually.

For this operation, the processor 120 may train the discriminator 300 based on training data composed of a plurality of image frames and an image frame following the plurality of image frames.

Referring to FIG. 5, the processor 120 may generate a prediction image frame 51' following the plurality of image frames 50 by inputting the plurality of image frames 50 to the generator 200.

In this case, the processor 120 may input the prediction image frame 51' to the discriminator 300. As a result, the discriminator 300 may identify whether the prediction image frame 51' is a real image frame or a fake image frame.

The processor 120 may input a real image frame 51 following the plurality of image frames 50 to the discriminator 300.

In this operation, the processor 120 may train or update the discriminator 300 such that the discriminator 300 identifies the real image frame 51 as a 'real image frame' and the prediction image frame 51' as a 'fake image frame'.

In addition, the processor 120 may train or update the generator 200 such that a probability that the discriminator 300 identifies the prediction image frame generated through the generator 200 as the 'real image frame' increases.

As such, the generator 200 of FIG. 5 constitutes a GAN together with the discriminator 300 and is trained to be hostile to each other, and as a result, its performance may be improved.

The processor 120 may detect an abnormal situation by using the trained generator 200 as the embodiment of FIG. 5. The abnormal situation refers to a situation that is contrary to a normal situation requiring quick discovery and response for personal or public safety, such as terrorism, natural disasters, accidents, occurrences of patient, damage/failures of equipment/facilities, etc., but is not limited thereto.

Specifically, the processor 120 may train the generator 200 and the discriminator 300 based on a plurality of image frames corresponding to a normal situation. Specifically, the processor 120 may train the generator 200 and the discriminator 300 using a plurality of image frames constituting one or more images identified (by humans) not to include the abnormal situation.

The processor 120 may generate a prediction image frame by inputting a plurality of image frames captured according to time into the generator 200, and as a result, may identify whether the abnormal situation has occurred based on the image frame captured after the plurality of captured image frames and the generated prediction image frame.

As a specific example, when a difference in image data between the actually captured image frame and the prediction image frame exceeds a preset value, the processor 120 may identify that the abnormal situation has occurred, but is not limited thereto.

FIG. 6 is a table illustrating an effect of the generator of the disclosure in which an attention layer is self-contained.

FIG. 6 illustrates conventional deep learning models for each of the CUHK dataset [19] and the UCSD dataset [20] and an area under curve (AUC) associated with the generator 200 according to the disclosure.

AUC is a value representing an area of a receiver operation characteristic (ROC) curve.

When threshold values of peak signal-to-noise ratio (PSNR) scores are gradually changed, the ROC curve is a curve representing a ratio of 'true positive' (e.g., a real image frame, and identified as a real image frame) to a ratio of 'false positive' (e.g., a virtual image frame, but identified as a real image frame).

The larger the AUC, the better the performance of the generator generating the prediction image frame.

Referring to FIG. 6, for each of the CUHK dataset and the UCSD dataset, the AUC of the generator 200 according to the disclosure is generally higher than that of conventional deep learning models.

Particularly, even if compared with 'Unet with OF [12]', which additionally uses a separate model trained to predict optical flow as well as a generator, the performance of the generator 200 of the disclosure implemented as a single model including the attention layer 215 itself does not fall behind numerically.

Figure 7:
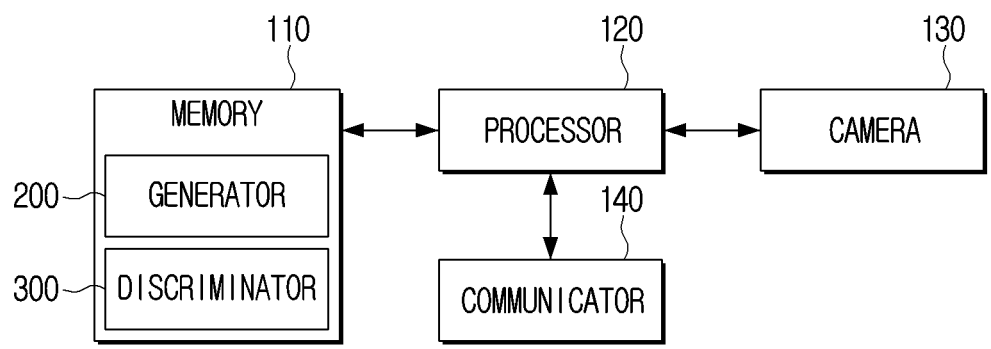
FIG. 7 is a block diagram illustrating a more detailed configuration of an electronic apparatus according to certain embodiments.

FIG. 7 is a block diagram illustrating a more detailed configuration of an electronic apparatus according to certain embodiments of the disclosure.

Referring to FIG. 7, in addition to the memory 110 and the processor 120, the electronic apparatus 10 according to the disclosure may further include a camera 130, a communicator 140, or the like.

Referring to FIG. 7, the memory 110 may further include the discriminator 300 of FIG. 5 in addition to the generator 200.

The camera 130 is a component for capturing at least one image. The processor 120 may generate a prediction image frame by inputting a plurality of image frames sequentially captured through the camera 130 into the generator 200.

The camera 130 may be implemented as an RGB camera, a 3D camera, or the like.

The processor 120 may input a plurality of image frames received from an external electronic apparatus to the generator 200 through the communicator 140.

For example, when a video captured through an external camera system is received through the communicator 140, a plurality of image frames constituting the received video may be input to the generator 200. In this operation, the processor 120 may compare the prediction image frame output through the generator 200 with a real image frame to identify whether an abnormal situation has occurred. In addition, when the abnormal situation occurs, the processor 120 may notify the external server that the abnormal situation has occurred through the communicator 140.

The communicator 140 may be directly/indirectly connected to an external electronic apparatus through wired communication and/or wireless communication. The communicator 140 may be directly/indirectly connected to an external electronic apparatus based on a network implemented through wired communication and/or wireless communication.

The wireless communication may include at least one of long-term evolution (LET), LTE advance (LTE-A), 5th Generation (5G) mobile communication, code division multiple access (CDMA), wideband CDMA (WCDMA), universal mobile telecommunications system (UMTS), wireless broadband (WiBro), global system for mobile communications (GSM), time division multiple access (DMA), Wi-Fi, Wi-Fi Direct, Bluetooth, near field communication (NFC), Zigbee, or the like.

Wired communication may include at least one of communication methods such as Ethernet, optical network, universal serial bus (USB), and ThunderBolt, or the like.

The network may be a personal area network (PAN), a local area network (LAN), a wide area network (WAN), etc., depending on areas or sizes, and may be Intranet, Extranet or the Internet depending on openness of the network.

The communicator 140 may include a network interface or a network chip according to the wired/wireless communication method described above. Meanwhile, the communication method is not limited to the example described above, and may include a communication method newly emerging according to technology development.

Hereinafter, a method of controlling the electronic apparatus according to an embodiment of the disclosure will be described with reference to FIG. 8.

Figure 8:
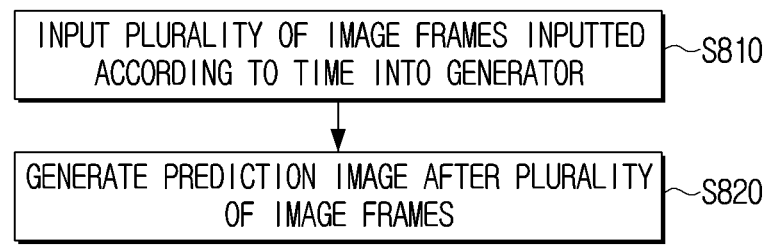
FIG. 8 is a flowchart illustrating a method for controlling an electronic apparatus according to an embodiment.

FIG. 8 is a flowchart illustrating a method of controlling an electronic apparatus according to an embodiment of the disclosure. The electronic apparatus may include a memory in which a generator trained to generate a prediction image based on one or more input images is stored.

Referring to FIG. 8, in the control method, a plurality of image frames input according to time may be input to the generator (S810). The plurality of image frames may be image frames sequentially input over time, and may be included in one image.

In addition, a prediction image frame following the plurality of image frames may be generated using the generator (S820).

In this operation, feature data may be acquired from a plurality of image frames input through at least one layer included in the generator. Through the attention layer included in the generator, feature data corresponding to a change over time may be extracted from the acquired feature data, and the extracted feature data may be input to at least one other layer included in the generator to acquire a prediction image frame.

The generator may include a first neural network including a first attention layer and a second neural network including a second attention layer. In the operation of S820, encoding of a plurality of image frames input through the first neural network may be performed, and decoding of data encoded through the first neural network may be performed through the second neural network.

In the process of performing encoding, max-pooling may be performed through the first attention layer, and in the process of performing decoding, deconvolution may be performed through the second attention layer.

Meanwhile, the control method may train a generator including the attention layer based on a result of comparing an input image frame after a plurality of image frames, and a prediction image frame.

Specifically, when each of the plurality of image frames is composed of a plurality of pixels, the attention layer may be trained to extract feature data of pixels predicted to change over time from feature data for each of the plurality of pixels output from at least one layer.

Meanwhile, if the memory includes a discriminator trained to identify whether the input image frame is a real image frame or a fake image frame, the generator may be trained based on the output acquired by inputting the prediction image frame to the discriminator.

If the plurality of image frames used for training of the generator and the discriminator correspond to a normal situation, the control method may generate a prediction image frame by inputting a plurality of image frames captured according to time into the generator, and identify whether an abnormal situation has occurred based on the image frame captured after the plurality of captured image frames and the generated prediction image frame.

The control method of the disclosure may be performed through the electronic apparatus 10 illustrated and described with reference to FIGS. 1 and 7. Alternatively, the control method of the disclosure described above may be performed through a system including the electronic apparatus 10 and one or more external electronic apparatus.

Various exemplary embodiments described above may be embodied in a recording medium that may be read by a computer or a similar apparatus to the computer by using software, hardware, or a combination thereof.

According to the hardware embodiment, exemplary embodiments that are described in the disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions.

In some cases, the embodiments described herein may be implemented by the processor 120 itself. In a software configuration, certain embodiments described in the specification such as a procedure and a function may be embodied as separate software modules. The software modules may respectively perform one or more functions and operations described in the present specification.

Meanwhile, computer instructions for performing a processing operation in the electronic apparatus 10 according to certain embodiments of the disclosure described above may be stored in a non-transitory computer-readable medium. When the computer instructions stored in the non-transitory computer-readable medium are executed by a processor of a specific device, the specific device described above performs the processing operation in the electronic apparatus 100 according to certain embodiments described above.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing descriptions of the embodiments of the disclosure are exemplary, and modifications to the configurations and implementation examples are possible within the technical scope of the disclosure. For example, the embodiments illustrated in FIGS. 1 to 8 are common, but these are only examples.

Although embodiments of the disclosure have been described as structural features or operations of a method, the subject matter defined in the claimed claims is not necessarily limited to the features and operations described above. Rather, the structural features and operations described above are only examples for introducing the scope of claims.

In addition, the order of each operation in the methods according to the disclosure is not limited to the examples described above. The order may be modified without any special effort by those skilled in the art within an apparent range. At least some of the operations included in each method may be performed sequentially or simultaneously. Certain operations may be omitted. The technical idea of the disclosure may be limited only through the following claims.

What is claimed is:

1. An electronic apparatus comprising
a memory storing a generator previously trained to generate a prediction image based on one or more input images;
wherein the generator is configured to include a first neural network for performing encoding with respect to plurality of inputted image frames, and a second neural network which is connected with the first neural network and configured to perform decoding with respect to data encoded through the first neural network,
wherein the first neural network includes a first attention layer and the second neural network includes a second attention layer, and
a processor configured to:
acquire feature data from a plurality of image frames input through at least one layer included in the generator,
extract feature data corresponding to change over time from the feature data acquired through an attention layer included in the generator,
acquire a first image data block by performing max-pooling and deconvolution through the first attention layer,
acquire a second image data block by performing max-pooling and deconvolution through the second attention layer, and
acquire a third image data block by performing concatenation of connecting the first image data block to the second image data block by inputting the first image data block in the second attention layer,
wherein the third image data block includes feature data for a resolution which is smaller than the existing number of pixels and image data corresponding to a change in motion over time,
acquire a first prediction image frame by inputting the extracted feature data and the third image data block to at least one other layer included in the generator,
wherein each of the plurality of image frames consists of a plurality of pixels, and
based on a result of comparing an image frame inputted after the plurality of image frames and the first prediction image frame, train the generator to extract feature data of pixels predicted to change over time from feature data for each of the plurality of pixels outputted from the at least one layer, and
acquire a second prediction image frame based on the trained generator.

2. The apparatus of claim 1, wherein the memory is configured to include a discriminator trained to identify whether the inputted image is a real image frame or not, and
wherein the processor is configured to train the generator based on output acquired by inputting the first prediction image frame into the discriminator.

3. The apparatus of claim 2, wherein the plurality of image frames are configured to correspond to a normal situation, and wherein the processor is configured to input the plurality of image frames captured according to time into the generator to generate the first prediction image frame, and based on an image frame captured after the plurality of captured image frames and the generated first prediction image frame, identify whether an abnormal situation occurs.

4. The apparatus of claim 1, wherein the generator is composed of U-net in which at least one output excluding an output layer from a plurality of layers of the first neural network is inputted into at least one layer excluding an input layer from the plurality of layers of the second neural network.

5. A method for controlling an electronic apparatus including a memory storing a generator previously trained to generate a prediction image based on one or more inputted images is stored, wherein the generator is configured to include a first neural network for performing encoding with respect to a plurality of inputted image frames, and a second neural network which is connected with the first neural network and configured to perform decoding with respect to data encoded through the first neural network, wherein the first neural network includes a first attention layer and the second neural network includes a second attention layer, the method comprising:

inputting a plurality of image frames inputted according to time into the generator;

acquiring feature data from a plurality of image frames input through at least one layer included in the generator, extracting feature data corresponding to change over time from the feature data acquired through an attention layer included in the generator, acquiring a first image data block by performing max-pooling and deconvolution through the first attention layer, acquiring a second image data block by performing max-pooling and deconvolution through the second attention layer, acquiring a third image data block by performing concatenation of connecting the first image data block to the second image data block by inputting the first image data block in the second attention layer, wherein the third image data block includes feature data for a resolution which is smaller than the existing number of pixels and image data corresponding to a change in motion over time, acquiring a first prediction image frame by inputting the extracted feature data and the third image data block to at least one other layer included in the generator, wherein each of the plurality of image frames consists of a plurality of pixels, and based on a result of comparing an image frame inputted after the plurality of image frames and the first prediction image frame, training the generator to extract feature data of pixels predicted to change over time from feature data for each of the plurality of pixels outputted from the at least one layer, and acquiring a second prediction image frame based on the trained generator.

6. The method of claim 5, wherein the memory is configured to include a discriminator trained to identify whether the inputted image is a real image frame or not, and wherein the training includes training the generator based on output acquired by inputting the first prediction image frame into the discriminator.

7. The method of claim 6, wherein the plurality of image frames are configured to correspond to a normal situation, and wherein the method further includes:

inputting the plurality of image frames captured according to time into the generator to generate the first prediction image frame; and based on an image frame captured after the plurality of captured image frames and the generated first prediction image frame, identifying whether an abnormal situation occurs.

8. The method of claim 5, wherein the generator is configured to include a first neural network including a first attention layer and a second neural network including a second attention layer, and wherein the generating the prediction image frame includes:

performing encoding with respect to the plurality of inputted image frames through the first neural network; and performing, through the second neural network, decoding with respect to data encoded through the first neural network, wherein the encoding includes performing max-pooling through the first attention layer, and wherein the decoding includes performing deconvolution through the second attention layer.

9. A non-transitory computer-readable recording medium that is executed by a processor of an electronic apparatus including a memory storing a generator previously trained to generate a prediction image based on one or more inputted image, wherein the generator is configured to include a first neural network for performing encoding with respect to a plurality of inputted image frames, and a second neural network which is connected with the first neural network and configured to perform decoding with respect to data encoded through the first neural network, wherein the first neural network includes a first attention layer and the second neural network includes a second attention layer, the non-transitory computer-readable recording medium storing at least one instruction to cause the electronic apparatus to perform a plurality of operations comprising:

inputting a plurality of image frames according to time;

acquiring feature data from the plurality of image frames input through at least one layer included in the generator;

extracting feature data corresponding to change over time from the feature data acquired through an attention layer included in the generator, acquiring a first image data block by performing max-pooling and deconvolution through the first attention layer, acquiring a second image data block by performing max-pooling and deconvolution through the second attention layer, acquiring a third image data block by performing concatenation of connecting the first image data block to the second image data block by inputting the first image data block in the second attention layer, wherein the third image data block includes feature data for a resolution which is smaller than the existing number of pixels and image data corresponding to a change in motion over time, acquiring a first prediction image frame by inputting the extracted feature data and the third image data block to at least one other layer included in the generator, wherein each of the plurality of image frames consists of a plurality of pixels, and based on a result of comparing an image frame inputted after the plurality of image frames and the first prediction image frame, training the generator to extract feature data of pixels predicted to change over time from feature data for each of the plurality of pixels outputted from the at least one layer, and acquiring a second prediction image frame based on the trained generator.

* * * * *